April 22, 1930.  C. J. TOWNSEND  1,755,903
FISHHOOK HOLDER
Filed June 20, 1929
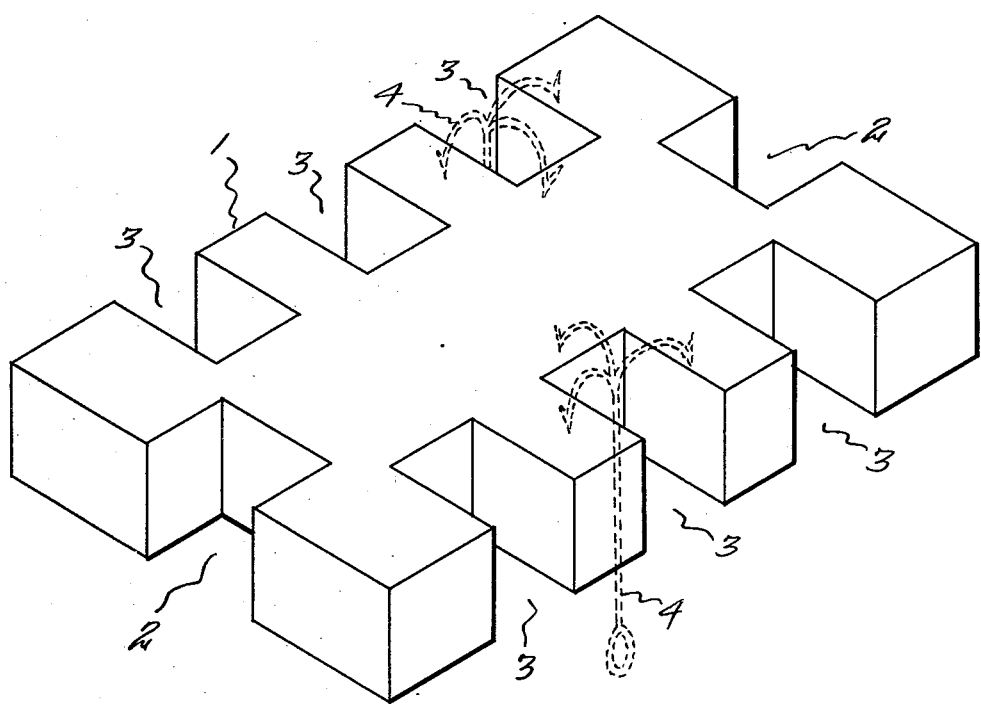
INVENTOR.
C. J. Townsend
BY
Carl Miller
ATTORNEY.

Patented Apr. 22, 1930

1,755,903

UNITED STATES PATENT OFFICE

CHARLIE J. TOWNSEND, OF POCATELLO, IDAHO

FISHHOOK HOLDER

Application filed June 20, 1929. Serial No. 372,470.

This invention relates to a fish hook holder and more particularly a holder made of a solid block of cork or other suitable material having cut out portions adapted to receive a plurality of fish hooks of varying sizes.

With the above and other objects in view, the improvement resides in the construction, combination and arrangement of parts set forth in the following specification and falling within the scope of the appended claim.

The single figure is a perspective view of the block showing the manner in which the same carries the fish hooks.

The fish hook holder 1 comprises a rectangular block of cork or other suitable material having a cut away portion 2 in each of its opposite ends. On each of the sides of the block or holder 1, three cut away spaced portions 3 are provided, said cut away portions may, if so desired, be of different sizes and of any desirable number.

As is apparent from the drawing each of the cut away portions is adapted to receive therein a fish hook 4, the barbed portions of the hooks being embedded in the block which is of comparatively soft material.

Having thus described the invention, what I claim is:—

A fish hook holder comprising a rectangular rigid block of relatively soft material, a plurality of cut away portions disposed around the sides of said block, said cut away portions being adapted to receive therein the shanks of a plurality of fish hooks with the points embedded in the block.

In testimony whereof, I affix my signature.

CHARLIE J. TOWNSEND.